United States Patent
Rimoto et al.

(10) Patent No.: US 6,478,678 B1
(45) Date of Patent: *Nov. 12, 2002

(54) COMPUTER READABLE RECORDING MEDIUM RECORDING A PROGRAM OF A BALL GAME AND THE PROGRAM, BALL GAME PROCESSING APPARATUS AND ITS METHODS

(75) Inventors: Shiyu Rimoto, Tokyo (JP); Toshiaki Nagashima, Tokyo (JP)

(73) Assignee: Square Co., Inc., Tokyo (JP)

( * ) Notice: Subject to any disclaimer, the term of this patent is extended or adjusted under 35 U.S.C. 154(b) by 89 days.

This patent is subject to a terminal disclaimer.

(21) Appl. No.: 09/670,543

(22) Filed: Sep. 27, 2000

(30) Foreign Application Priority Data

Jun. 7, 2000 (JP) .......................... 2000-169918
Aug. 31, 2000 (JP) .......................... 2000-264554

(51) Int. Cl.⁷ ................................ A63F 13/00
(52) U.S. Cl. ................ 463/31; 463/1; 463/2; 463/3; 463/4; 463/32; 273/317; 273/317.1; 273/317.5; 273/317.3; 273/317.4; 273/317.6; 273/460; 273/461
(58) Field of Search .................. 463/1–5, 30–32, 463/43; 273/317, 317.1, 317.6, 108.1, 108.2, 237, 460, 461, 454

(56) References Cited

U.S. PATENT DOCUMENTS

| | | | | |
|---|---|---|---|---|
| 5,863,248 A | * | 1/1999 | Mine et al. | 463/31 |
| 6,102,801 A | * | 8/2000 | Sugawara | 463/3 |
| 6,203,431 B1 | * | 3/2001 | Miyamoto et al. | 345/419 |
| 6,244,956 B1 | * | 6/2001 | Nakayama et al. | 463/3 |
| 6,334,813 B1 | * | 1/2002 | Rimoto et al. | 463/1 |

* cited by examiner

*Primary Examiner*—Jessica Harrison
*Assistant Examiner*—Yveste G. Cherubin
(74) *Attorney, Agent, or Firm*—Greenblum & Bernstein, P.L.C.

(57) ABSTRACT

After a batter hits a ball, the height of the ball moving on a trajectory passing through present movement positions is judged. For example, future movement positions positioned on a time axis ahead of the present movement positions are indicated on the ground by elliptical marks. The peak of the height becomes a boundary, and in a rising process of the ball, the mark is displayed in a first color, and in a falling process of the ball, the mark is displayed in a second color. Therefore, the enjoyment of operations by the combination of the operation support of a computer and the operation skill of the user himself can be obtained.

28 Claims, 4 Drawing Sheets

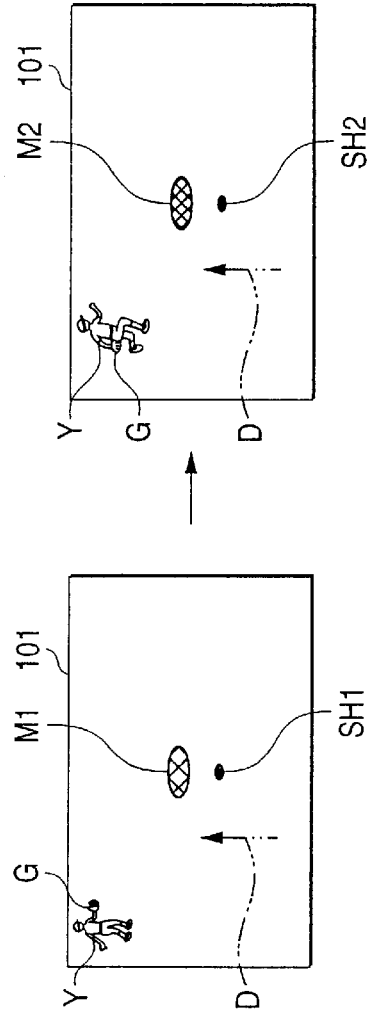
FIG. 3A
FIG. 3B
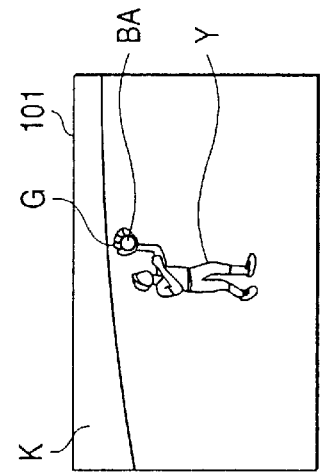
FIG. 3E
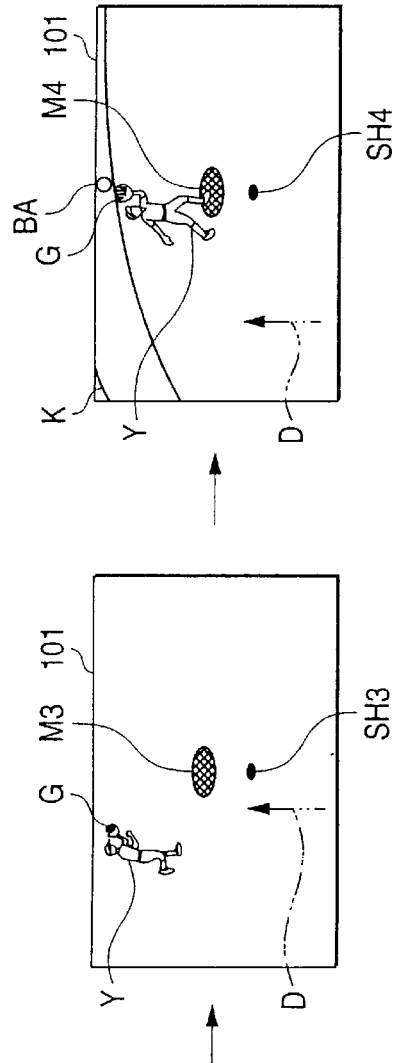
FIG. 3C
FIG. 3D

COMPUTER READABLE RECORDING MEDIUM RECORDING A PROGRAM OF A BALL GAME AND THE PROGRAM, BALL GAME PROCESSING APPARATUS AND ITS METHODS

CROSS REFERENCE TO RELATED APPLICATION

The present disclosure relates to subject matter contained in Japanese Patent Application No. 2000-264554, filed on Aug. 31, 2000, the disclosure of which is expressly incorporated herein by reference in its entirety.

BACKGROUND OF THE INVENTION

1. Field of the Invention

The present invention relates to video games. More particularly, the present invention relates to a sports video game in which a player handles a movable ball on the ground.

2. Description of the Related Art

In a ball game such as a baseball game or a soccer game, in general, there often occurs a scene in which a ball flies high or a scene in which a ball moves far away. The foregoing scene is formed by making a player hit a ball with a bat or making a player kick a ball through a user's operation.

For example, in a baseball game, in the case where a batter makes a hit to the outfield, there is a case where the ball goes up after the hit and disappears from a screen. At this time, the scene is changed to a fielding state of a fielder playing the outfield, and priority is given to provision of the scene in which the user can operate the movement of the fielder.

In addition to such consideration, when the ball goes out of the screen, processing to inform the user of the position of the ball is performed. That is, in general, there is adopted such a method that the arrival point (fall point has also the same meaning) of the ball is obtained by calculation in advance, and a mark is given to the arrival point. In the baseball game like this, such processing is performed that when a batter hits a ball, a mark is displayed at the arrival point of the ball.

For example, in "PLAY-BY-PLAY POWERFUL PROFESSIONAL BASEBALL 99" (product by Konami Co., Ltd.), such processing is performed that an elliptical mark is displayed at an arrival point of a ball hit by a batter, and the mark is rotated until the ball arrives. For the user, the arrival point of the ball can be found at an early stage, and thereby, it is possible to quickly move a fielder capable of catching the ball to the arrival point of the ball, Also in "SUPER-SPACE NIGHTER PROFESSIONAL BASEBALL KING 2" (product by Imagineer Co., Ltd.) or "MAJOR LEAGUE BASEBALL TRIPLE PLAY 99" (product by Electronic Arts Victor Inc.), such processing as to display an elliptical mark at the arrival point of a ball hit by a batter is performed similarly. In this case, such a method is adopted that the size of the mark is changed until the ball arrives so that the arrival point is emphasized.

In recent years, with the improvement of technique of computer graphics, the expressive power for a game has been abundant. Thus, the more abundant the expressive power becomes, the more realistically the movement of a player appearing in the game or the movement of a ball indirectly moved and controlled can be displayed. The expression with such reality raises a feeling of presence still more, and considering an operation input necessary for game proceedings while judging the movement of a player or the direction of a ball from the real display becomes enjoyable.

However, in the foregoing prior art, since the arrival point of a ball is indicated by a mark in advance, the user has only to concentrate the operation on moving the player toward the display mark (arrival point of the ball). Thus, it is not necessary for the user himself or herself to predict the trajectory or arrival point of a ball traveling such a flying distance or height as to go out of the screen, and the operation is a simplified one, that is, the movement to the arrival point, though the expressive power for the game is improved.

SUMMARY OF THE INVENTION

An object of the present invention is to provide a computer readable recording medium recording a program of a ball game and the program, and a ball game processing apparatus and its method, in which the real pleasure of operations by the combination of the operation support of a computer and the operation skill of the user himself can be obtained.

In order to solve the foregoing problem and to achieve the above object, according to a first aspect of the present invention, a computer readable recording medium records a program of a ball game, which realizes the ball game in which a player handles a movable ball on the ground. The program causes a computer to execute a calculation of a trajectory of the moving ball, a judgement of a height of the ball moving on the calculated trajectory at a present movement position, and an indication of a future movement position positioned ahead of the present movement position on a time axis by a mark on the ground. The mark follows a movement position of the ball moving on the calculated trajectory, and changes a color in accordance with the judged height of the ball at the present movement position.

According to a second aspect of the present invention, a program of a ball game realizes the ball game in which a player handles a movable ball on the ground. The program causes a computer to execute a calculation of a trajectory of the moving ball, a judgement of a height of the ball moving on the calculated trajectory at a present movement position, and an indication of a future movement position positioned ahead of the present movement position on a time axis by a mark on the ground. The mark follows a movement position of the ball moving on the calculated trajectory, and changes color in accordance with the judged height of the ball at the present movement position.

According to a third aspect of the present invention, a ball game processing apparatus includes a computer readable recording medium recording a program for realizing a ball game in which a ball is handled on the ground, a computer for reading out at least a part of the program from the recording medium and executing it, and a display for displaying the ball game realized by the program. The computer reads out at least the part of the program from the recording medium to calculate a trajectory of a moving ball, and to judge a height of the ball moving on the calculated trajectory at a present movement position. The computer also indicates a future movement position positioned ahead of the present movement position on a time axis by a mark on the ground. The mark follows a movement position of the ball moving on the calculated trajectory, and changes color in accordance with the judged height of the ball at the present movement position.

According to a fourth aspect of the present invention, a ball game processing method for realizing a ball game in which a player handles a movable ball on the ground is characterized in that a trajectory of a moving ball is calculated. The method also includes judging a height of the ball moving on the calculated trajectory at a present moving position, and indicating a future moving position positioned ahead of the present movement position on a time axis by a mark on the ground. The mark follows a movement position of the ball moving on the calculated trajectory, and a color of the displayed mark is changed in accordance with the judged height of the ball at the present movement position.

BRIEF DESCRIPTION OF THE DRAWINGS

FIGS. 3A to 3E are views showing the transition state of a screen according to an embodiment of the present invention.

DETAILED DESCRIPTION OF THE PREFERRED EMBODIMENTS

Hereinafter, an embodiment of the present invention will be described in detail with reference to the accompanying drawings. In the following description, a baseball game among ball games will be described as an example.

Figure 1:
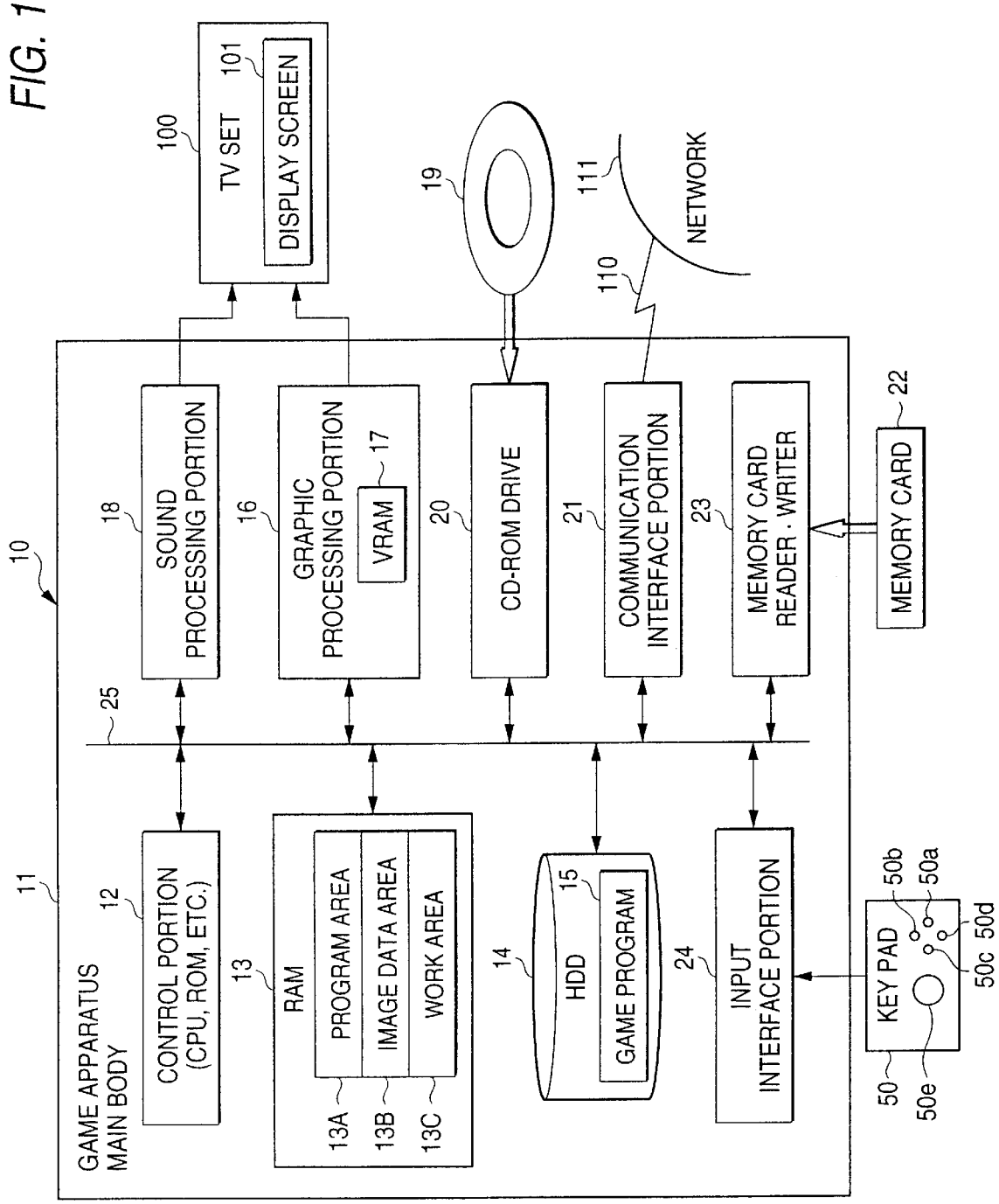
FIG. 1 is a block diagram showing a structural example of a video game apparatus according to an embodiment of the present invention.

First, the constitution of the embodiment of the present invention will be described. FIG. 1 shows a structural example of a video game apparatus according to this embodiment. A video game apparatus 1 shown in FIG. 1 includes the function of a ball game processing apparatus according to this embodiment. This video game apparatus 10 executes a program recorded on a computer readable recording medium according to this embodiment. In addition, this video game apparatus 10 executes a program according to this embodiment. Moreover, this video game apparatus 10 is used for executing a ball game processing method according to this embodiment.

The video game apparatus 10 includes, for example, a game machine main body 11 for processing a video game in accordance with a program, a keypad 50 for interactively operating the video game, and a television set (hereinafter referred to as a TV set) 100 having a CRT or the like as a monitor with a speaker. Besides, this video game apparatus 10 includes a communications interface portion 21 and is connected to a network 111 through a communications line 110 so that data communications with other network apparatuses is performed.

The keypad 50 includes a button group (for example, a button 50a, a button 50b, a button 50c, and a button 50d) which the user can operate, and a joystick 50e, and gives instructions by the button operation and joystick operation of the user to the game machine main body 11. Here, the button group and the joystick 50e have the function of inputting a pitching operation of a pitcher, a swing operation of a batter, a catching/throwing operation of a fielder, and the like.

The TV set 100 makes a picture (image) display and sound output in accordance with the game content on the basis of a video signal (picture signal) and a sound signal output from the game machine main body 11.

The game machine main body 11 includes an internal bus 25. A control portion 12 provided with a unit such as a CPU and ROM, a RAM 13, and a hard disk drive (hereinafter referred to as a HDD) 14 are connected to this internal bus 25.

The control portion 12 controls the whole apparatus, and executes a game processing while a part or all of the program is stored in the RAM 13.

The RAM 13 includes a program area 13A, an image data area 13B, a work area 13C and the like. The program area 13A stores a program of a game. Specifically, a CD-ROM 19 stores, for example, a game program in accordance with a flowchart shown in FIG. 4.

The program area 13A stores a part or all of the game program read by a CD-ROM drive 20 from the CD-ROM 19. The image data area 13B stores image data of a background, game characters, and the like required in a program execution process. The work area 13C stores various data generated in the program execution process.

Figure 4:
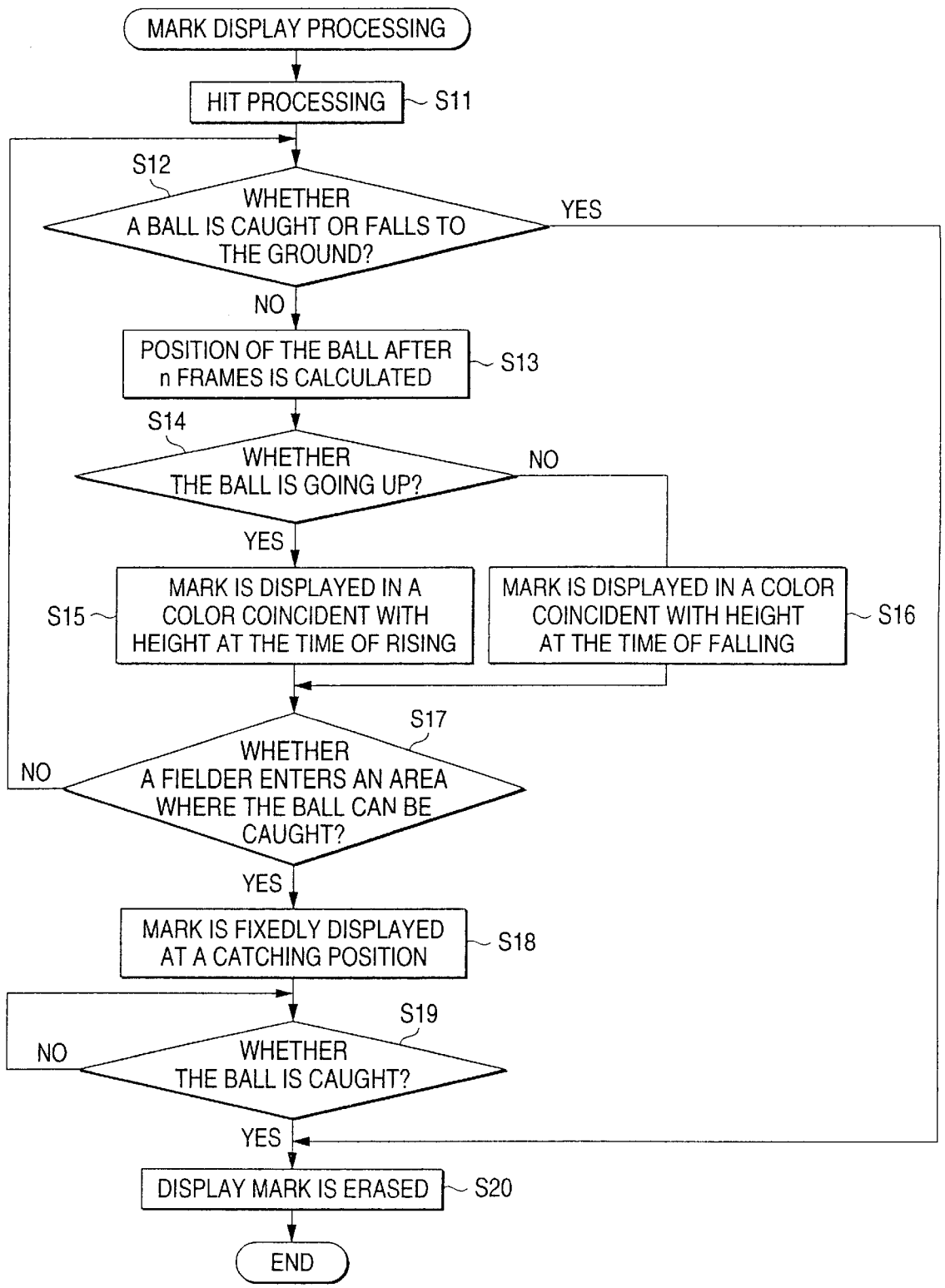
FIG. 4 is a flowchart for explaining an operation example according to an embodiment of the present invention.

Incidentally, the game program shown in FIG. 4 and image data can also be supplied from the HDD 14 in addition to the CD-ROM 19. In this case, the above game program and image data may be stored in a hard disk 15 of the HDD 14. The game program in accordance with the flowchart shown in FIG. 4 and the image data may be stored in the hard disk 15 by prior installation or download from the network 111 through the communication line 110.

An input interface portion 24, a sound processing portion 18, and a graphics processing portion 16 are connected to the internal bus 25. The keypad 50 is connected to the internal bus 25 through the input interface portion 24. The TV set 100 is connected to the internal bus 25 through the sound processing portion 18 and the graphics processing portion 16.

The graphics processing portion 16 includes a VRAM 17 including a frame buffer. This graphics processing portion 16 generates a video signal on the basis of the image data stored in the frame buffer by instructions from the control portion 12 as the program is executed, and outputs the video signal to the TV set 100. By this, an image display based on the image data stored in the frame buffer is obtained on a display screen 101 of the TV set 100.

The sound processing portion 18 generates a sound signal of voice, BGM (background music), effective sound, or the like in accordance with instructions from the control portion 12, and outputs the sound signal to the TV set 100.

Further, the CD-ROM drive 20 and a memory card reader/writer 23 are connected to the internal bus 25. The CD-ROM drive 20 reads the game program, image data, sound data, and the like stored in the CD-ROM 19 as a recording medium. The memory card reader/writer 23 writes data in and reads data from a memory card 22 in accordance with the control of the control portion 12. The data written in the memory card 22 include data indicating the progress in the middle of the game, data indicating environmental setting of the game, and the like.

Figure 2:
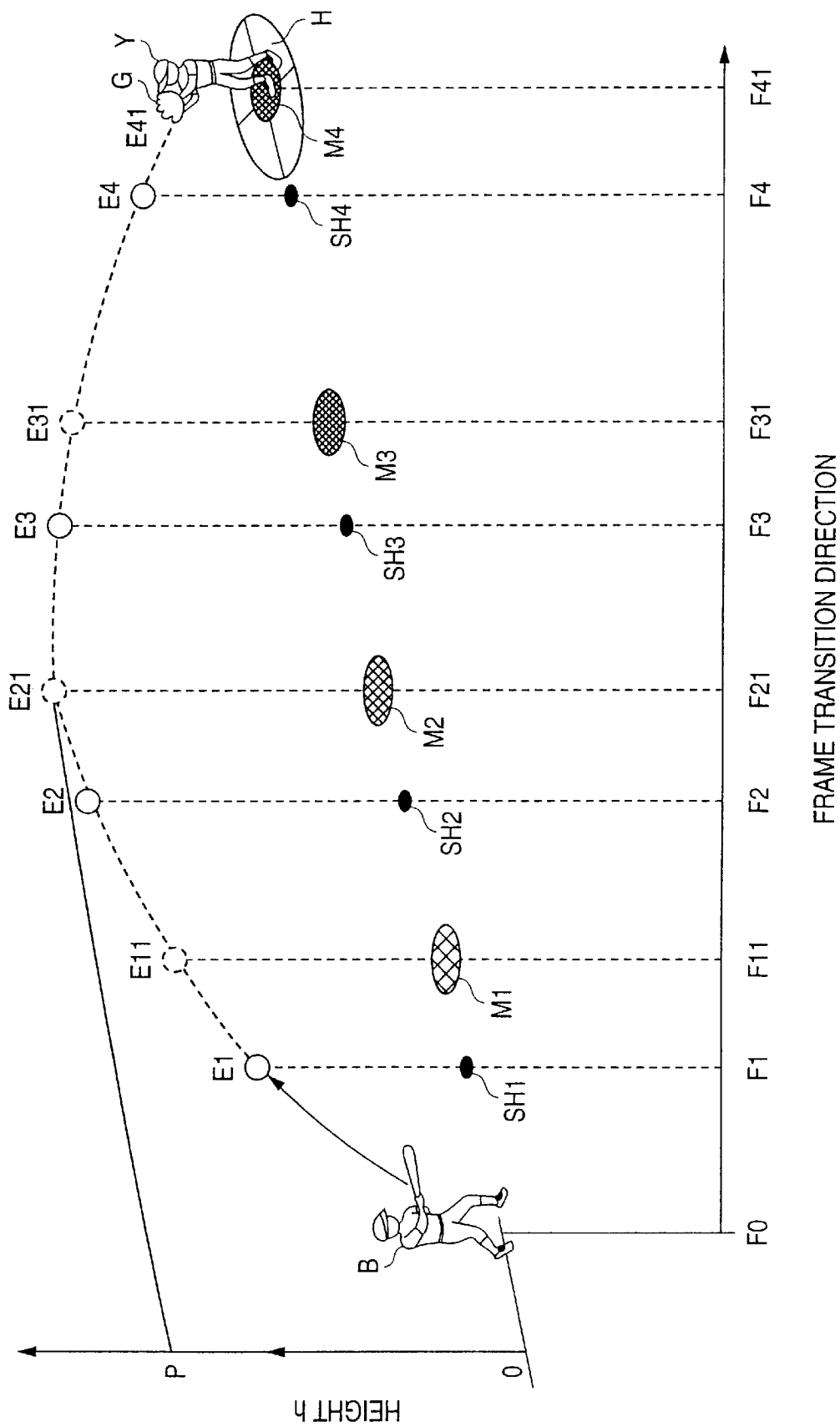
FIG. 2 is a view for explaining the relation between a ball and a mark according to an embodiment of the present invention.

Next, a state transition of a ball according to this embodiment will be described. FIG. 2 is a view for conceptually explaining the movement of a ball from the execution of a batting operation by a batter to the catch by a fielder in this embodiment. In this embodiment, the position of the ball several frames ahead of the position of the ball at the present moment is predicted, a mark larger than a shadow so that it can be easily distinguished from the shadow of the ball is displayed, and the mark is moved while being made to follow the ball.

In FIG. 2, for example, reference character B designates a batter; Y, a fielder; and G, a glove of the fielder Y. Reference character H designates an elliptical region in which it is judged that the fielder Y can catch a ball, and the region will be hereinafter referred to as a catching possible region. Reference character h designates a height from the ground to the ball; and P, a peak of the height h from the ground on a trajectory of the moving ball.

Reference characters E1, E2, E3 and E4 designate examples of movement positions of the ball on the trajectory, respectively. Reference characters E11, E21, E31 and E41 correspond to the present movement positions E1, E2, E3 and E4, respectively, and schematically designate future movement positions positioned ahead of the respective corresponding present movement positions on a time axis. The future movement position indicates the position of the ball positioned 30 frames ahead of the present movement position, which will be described later in detail.

Reference characters F0, F1, F11, F2, F21, F3, F31, F4 and F41 designate frame numbers, respectively. For example, the frame number F0 indicates a frame (one frame is, for example, 1/60 second) corresponding to a scene in which the batter B hits the ball. The frames F1, F2, F3 and F4 are frames corresponding to the movement positions E1, E2, E3 and E4 of the ball, respectively.

The frames F11, F21, F31 and F41 are frames corresponding to the movement positions E11, E21, E31 and E41 of the ball, respectively. Here, F11 is a frame number after 30 frames from the frame F1, and similarly, F21, F31, and F41 are frame numbers after 30 frames from F2, F3 and F4, respectively. Incidentally, the interval of the 30 frames is merely an example, and various modifications such as 20 frames or p40 frames can be made.

FIG. 2 shows an example of from a scene (frame F0) where the batter B hits the ball to a scene (frame F41) where the ball is caught by the fielder Y. In the example of FIG. 2, although marks are displayed correspondingly to the positions E1, E2, E3 and E4 of the ball, actually, for every frame, a future movement position of the ball is predicted (calculated) correspondingly to the present movement position, and a mark is displayed on, for example, the ground just under the future movement position. Hereinafter, the future movement position of the ball is called a movement predicted position.

In FIG. 2, the trajectory of the ball is indicated by a solid line from the bat position of the batter B to the position E1, and a broken line from the position E1 to the position E41. In this embodiment, the movement predicted position of the ball is obtained from the position, moving direction, and moving speed of the ball at the present moment. Incidentally, in an open-air baseball stadium, if the influence of weather such as wind, the influence due to the rotation of the ball, and the like are added, disturbance information can be given to the movement calculation of the ball. By this, different characteristics in the progress of a game can be given to each baseball stadium, and the reality can be further improved. Like this, the degree of addition of the disturbance information can be variously modified in accordance with a demand for the reality of the game.

In FIG. 2, reference characters SH1, SH2, SH3 and SH4 correspond to the present movement positions E1, E2, E3 and E4, and designate shadows (for example, black) of the ball projected on the ground just under the ball at the present movement position. Each of the shadows SH1, SH2, SH3 and SH4 of the ball is displayed in a fixed or variable size and an elliptical shape at a portion where a perpendicular line drawn from the present movement position to the ground intersects with the ground.

Here, although there is cited an example in which the shadow of the ball is displayed at the position just under the movement position, the present invention is not limited to this, but the shadow of the ball may be displayed roughly just under the position. In this embodiment, although the shadow of the ball is displayed in an elliptical shape, the present invention is not limited to this, but the shadow may be displayed in another shape such as a polygon. Besides, in this embodiment, although the shadow of the ball is displayed in a fixed size, the present invention is not limited to this, but the size of the shadow may be changed in accordance with the height of the ball, for example, the higher the position is, the smaller the shadow of the ball is. Besides, in this embodiment, although the shadow of the ball is displayed in black, the present invention is not limited to this, but another color such as red may be used as long as it can be distinguished from the color of the ground.

In FIG. 2, reference characters M1, M2, M3 and M4 correspond to the movement predicted positions E11, E21, E31 and E41, and designate marks corresponding to the positions of the ball positioned 30 frames ahead of the shadows SH1, SH2, SH3 and SH4. These marks M1, M2, M3 and M4 are set to sizes larger than the shadows of the ball for discrimination from the shadows SH1, SH2, SH3 and SH4 of the ball. Incidentally, the display of the foregoing marks M1, M2, M3 and M4 is an example in which the mark is made to correspond to the movement position of the ball shown in FIG. 2, and although not shown, the mark is actually displayed correspondingly for each frame.

The marks M1, M2, M3 and M4 are displayed in colors corresponding to the height h of the ball. The mark (for example, the mark M1, M2, M3 or M4) is an index indicating the movement predicted position of the ball at the present moment, the height of the ball, and the moving state of the ball of rising or falling.

In this embodiment, after the batting operation by the batter is made, the mark is displayed until the ball first falls to the ground or until the ball is caught by the fielder. The mark is displayed at the portion where the perpendicular line drawn to the ground from the movement predicted position positioned 30 frames ahead of the ball at the present moment intersects with the plane expressing the ground.

Here, although there is cited an example in which the mark is displayed just under the movement position positioned 30 frames ahead of the present movement position, the present invention is not limited to this, but the mark may be displayed roughly just under the position not just under. In either case, the mark is moved to follow the ball. By this, the user can previously comprehend the position of the ball positioned 30 frames ahead by viewing the position of the mark.

As shown in FIG. 2, the mark is displayed in the elliptical shape as an example. Also, the mark is displayed such that the color of the ball is changed stepwise in accordance with the height h of the ball at the present moment.

In this embodiment, the color of the mark is changed in accordance with the height of the ball at the present moment. Specifically, in the process until the present movement position of the ball moves to the peak P, the mark is displayed in, for example, blue. On the other hand, in the falling process after the present movement position of the ball passes through the peak P, the mark is displayed in, for example, red. In this way, the processing of changing the color of the mark by whether the ball is going up or going down is performed. That is, in the case where the ball is going up (including the moment of the peak P), the mark is displayed in a first color (for example, blue), and on the other hand, in the case where the ball is going down, the mark is displayed in a second color (for example, red). By this, the user can easily comprehend whether the ball is going up or going down at present by viewing the color of the mark.

In this embodiment, although the color of the mark is changed when the present movement position of the ball passes the peak P, the present invention is not limited to this, but the color of the mark may be changed when the movement predicted position of the ball reaches the peak P.

Of course, during the rising of the ball as well, blue of the first color may be changed stepwise in density, and during the falling of the ball as well, red of the second color may be changed stepwise in density. Further, the color may be changed like blue, yellow and red from the rising to the falling, or colors may be mixed.

Next, with reference to FIG. 2, the display transition of the ball will be described in time series from the batting operation of the batter. When the batter B hits the ball, the trajectory of the ball is judged from the batting power to the ball at the time of batting, the ball direction, and the like. In the case where the ball is moved as a fly ball, as shown in FIG. 2, the trajectory of the ball describes a parabola making a transition, for example, like the present movement positions E1, E2, E3 and E4.

When the batting operation in which the batter B hits the ball is performed by the user's operation of the keypad 50 (for example, frame F0: see FIG. 2), the movement direction, movement speed, and the like of the ball are determined. The ball is moved in the imaginary space, and the ball is displayed at the present movement position El at the stage of the frame F1.

From the movement direction, movement speed, and the like of the ball at the stage of the frame F1, the movement predicted position E11 of the moving ball at the stage of the frame F11 is calculated. On the ground, the shadow SH1 of the ball is displayed corresponding to the present movement position E1, and the mark M1 is displayed corresponding to the movement predicted position E11. In the example of FIG. 2, since the ball is going up at the moment when it passes through the present movement position E1, the mark M1 is displayed in blue.

Next, at the stage of the frame F2, the ball is displayed at the present movement position E2. From the movement direction, movement speed, and the like of the ball at the stage of the frame F2, the movement predicted position E21 of the ball at the frame F21 is calculated.

The shadow SH2 of the ball corresponding to the present movement position E2 is displayed on the ground, and the mark M2 corresponding to the movement predicted position E21 is displayed. Since the ball is going up at the moment when it passes through the present movement position E2, the mark M2 is displayed in blue. Here, although the present movement position E2 becomes higher than the present movement position E1 as the ball goes up, the color of the mark M2 remains blue since it does not reach the peak P.

Subsequently, at the frame F3, the ball is displayed at the present movement position E3. From the moving direction and moving speed of the ball at the stage of the frame F3, the movement predicted position E31 of the ball at the frame F31 is calculated. The shadow SH3 corresponding to the present movement position E3 is displayed on the ground, and the mark M3 corresponding to the movement predicted position E31 is displayed as well.

The present movement position E3 is a position where the ball has passed through the peak P on the trajectory of the ball. Since the ball goes down after the peak P, the color of the mark M3 is changed from blue to red and it is displayed. Here, even in the case where the present movement position E3 is higher than the present movement position E2, the movement predicted position E21 is the peak and the movement predicted position E31 is lower than the peak.

In the case where rising or falling of the ball is judged in consideration of disturbance information as well, there is a case where the ball again goes up by, for example, the influence of a gust of wind. In such a case, as described above, the processing as the rising of the ball is performed.

Next, at the frame F4, the ball is displayed at the present movement position E4. At the present movement position E4, differently from the past present movement positions E1, E2 and E3, there occurs a scene where the fielder Y reaches the catching possible region H at the stage of the frame F41. Here, from the moving direction, moving speed and the like of the ball at the frame F4, the movement predicted position E41 at the frame F41 is calculated. The shadow SH4 of the ball corresponding to the present movement position E4 is displayed on the ground, and the mark M4 corresponding to the movement predicted position E41 of the ball is displayed as well.

In the example of FIG. 2, as is apparent from the frame F41, since the fielder Y is positioned on the mark M4, it is judged that the mark M4 enters the catching possible region H of the ball at the present movement position E4. In this embodiment, the display position of the mark is fixed in accordance with this judgement. Then, the display of the mark M4 is erased at the stage where the ball is caught during the continuation of the state where the mark is displayed.

Here, in this embodiment, although the mark is displayed at the position positioned 30 frames ahead, the invention is not limited to this.

Next, with reference to FIGS. 3A to 3E, a description will be made on what state transition appears on the display screen from the rough explanation described in FIG. 2. FIGS. 3A, 3B, 3C, 3D and 3E are views for explaining a display transition example of the mark according to this embodiment. In FIGS. 3A to 3E, the portions having the same functions as those of FIG. 2 are designated by the same reference characters and their explanation is omitted. In FIGS. 3A to 3E, reference character BA designates a ball, and D, a direction (hereinafter referred to as a moving direction) in which the ball moves. Incidentally, the moving direction is not actually displayed on the screen. The reference character SH0 designates a shadow of the ball BA at the frame F0 (see FIG. 2); and K, a fence of a baseball stadium.

When the batter B hits the ball BA thrown by a pitcher, the batting operation of the batter B is executed through the operation input of the keypad 50 by the user. At this time, it is assumed that the ball flies to the outfield.

FIG. 3A shows a scene corresponding to the frame F1 in FIG. 2. The fielder Y, the shadow SH1 of the ball BA going out of a display screen 101, and the mark M1 positioned ahead of the position of the ball BA on the time axis are displayed on the display screen 101. Since the ball BA hit by the batter B is moved in the direction of the arrow D (it is not actually displayed on the display screen 101), the mark M1 is disposed ahead of the shadow SH1 in the direction of the arrow D. Here, the mark M1 is displayed in blue.

Even in the scene of FIG. 3B, there is shown a state where the user can not directly see the ball BA on the display screen 101. However, since the mark M1 is blue, the user can easily comprehend that the ball BA is going up and moving in the direction of the arrow D. The user sees the trajectory of the ball from the color of the mark M1, and causes the movement of the fielder Y to follow the moving direction of the ball BA through the operation of the keypad 50.

FIG. 3B is a view corresponding to the frame F2. There is shown a state where the fielder Y runs after the ball BA. The ball BA is not displayed on the display screen 101, and the shadow SH2 of the ball and the blue mark M2 are displayed. Although the user can not directly see the ball BA, the user can easily comprehend that the ball BA is going up at this stage since the mark M2 is blue.

The user operates, for example, the joystick 50e, so that the fielder Y is moved in the direction of the arrow D in which the ball BA moves.

FIG. 3C is a view corresponding to the frame F3 in FIG. 2. The ball BA is not displayed on the display screen 101, and the shadow SH3 of the ball and the red mark M3 are displayed. Although the user can not directly see the ball BA, the user can easily comprehend that the ball BA is going down since the color of the mark M3 is changed from blue to red. As the ball starts going down, the user starts an operation for catching the ball BA moving in the direction of the arrow D by operating the joystick 50e.

FIG. 3D is a view corresponding to the frame F4 in FIG. 2. There is shown a state where the fielder Y runs after the ball BA to the vicinity of the fence K of the baseball stadium. Besides, there is shown a state where the fielder Y starts the catching operation. Not only the shadow of the ball and the red mark M4 but also the ball BA is displayed on the display screen 101 at the same time. In FIG. 3D, it is judged that the fielder Y enters the catching possible region H since he is positioned in the mark M4. The movement of the mark M4 is stopped and is fixedly displayed on the ground. The user can easily comprehend that the fielder Y enters the catching possible region H from the fixedly displayed mark M4.

FIG. 3E is a view corresponding to the frame F41 in FIG. 2. There is shown a state where the fielder Y catches the ball BA by the glove G. When the ball is caught by the fielder Y, the mark M4 is erased from the screen.

Next, the operation of this embodiment will be described. Incidentally, the control portion 12 of the game machine main body 11 executes a program, so that the following processing is performed. FIG. 4 is a flowchart for explaining an example of the operation according to this embodiment. Incidentally, during the execution of the operation shown in this flowchart, although a fielder who is to catch a ball can be operated by the user's operation of the joystick of the keypad 50 or the like, in the following explanation, a description will be made mainly on the processing of a mark after a batter hits a ball.

After the batter hits the ball, first, the processing of displaying the mark while the mark is made to follow the trajectory of the ball is started. For that purpose, a hit processing for determining the moving direction, moving angle, and initial speed of the ball is executed (step S11). The moving direction, moving angle, and initial speed of the ball are determined by the timing of a hitting operation and the like.

Subsequently, it is judged whether the ball is caught by a fielder or falls to the ground (step S12). In the case where it is judged that the ball is not caught by the fielder and the ball does not fall to the ground (step S12: NO route), as shown in FIG. 2, the processing of displaying the mark while the mark is made to follow the moving position of the ball is started. That is, the frame at the present moment is made an original point, and the position of the ball n (n is a natural number) frames ahead is calculated (step S13).

The position of the ball n frames ahead of the frame at the present moment is calculated from the position, moving angle, moving speed, and the like of the ball at the present moment. If it is desired to produce reality, the influence of weather such as wind in the baseball stadium may be additionally considered. In this embodiment, although the position of the ball positioned 30 frames ahead of the position at the present moment is calculated, the invention is not limited to this number of frames.

On the basis of the position of the ball n frames ahead, which is obtained at step S13, it is judged whether or not the ball is going up on the trajectory of the ball (step S14). That is, in the case where the height h (see FIG. 2) of the ball n frames ahead is higher than the height of the ball at the present moment, it is judged that the ball is going up. In the case where the height h (see FIG. 2) of the ball n frames ahead is lower than the height of the ball at the present moment, it is judged that the ball is going down.

Thus, in the case where it is judged that the ball is going up (step S14: YES route), the mark is displayed in blue (step S15). On the other hand, in the case where it is judged that the ball is going down (step S14: NO route), the mark is displayed in red (step S16).

Subsequently, it is judged whether the fielder enters the catching possible region (step S17). Specifically, it is judged whether the ball at the present moment reaches, after 30 frames, the catching possible region (see the catching possible region H of FIG. 2) made to correspond to the fielder who is to catch the ball. That is, as shown in FIG. 2, since it is judged whether catching can be made from the positional relation between the catching possible region H and the mark M4, it is judged that catching can be made not only in the case where the fielder Y is positioned on the mark M4, but also in the case where the fielder Y is positioned in the vicinity of the mark M4. The size relation between the mark and the catching possible region of the fielder can be variously changed.

In the case where it is judged that the fielder enters the catching possible region to the ball at the present moment (step S17: YES route), the operation of the fielder is shifted from the operation of the user to the control of the computer, the fielder starts a catching action automatically, and the mark is fixedly displayed at the catching position of the ball without changing the color (step S18). Then the processing proceeds to step S19.

Then it is judged whether the ball is caught by the fielder (step S19). In the case where it is judged that the ball is caught by the fielder (step S19: YES route), the mark displayed at present is erased from the display screen (step S20), and the mark display processing is ended. Incidentally, after the fixed display of the mark, until the ball is caught by the fielder (step S19: NO route), the fixed display of the mark at step S18 is held.

At step S17, in the case where it is judged that the fielder does not enter the catching possible range with respect to the position of the ball at the present moment (step S17: NO route), the processing returns to step S12, and it is judged whether the ball is caught or the ball falls to the ground. The fall of the ball to the ground is judged by the state of a foul, a home run, a hit, or the like. Subsequently, the processing after step S12 is executed.

In the case where it is judged that the fielder catches the ball as a liner, a fly or the like, or it is judged where the ball falls to the ground as a foul, a home run, a hit, or the like (step S12: YES route), the processing jumps to step S20 and the display of the mark is erased. In this way, the mark display processing is ended.

As described above, according to this embodiment, in the baseball game, the trajectory of the ball hit by the batter is calculated, and the future movement position positioned ahead of the present movement position on the time axis can be marked on the ground while marking is made to follow the movement position of the ball moving on the calculated trajectory. By this, the user can previously know the slightly later position on the trajectory as to the ball changing every moment. In this case, since the falling position is not immediately indicated to the user, the real pleasure of operations to cause the fielder to follow the movement of the ball remains. In addition to this, since the rather later movement position on the trajectory is indicated by a mark, it becomes possible to give time to spare for the operation of the fielder.

In this embodiment, whether the ball is going up or going down can be differentiated by the color display of the mark. Thus, it becomes clear that the ball is going up when the color of the ball is a first color (for example, blue) and that the ball is going down when the color of the mark is a second color (for example, red), and the visual recognition can be improved.

Like this, the operation result by the combination of the operation support (mark display) of the computer and the skill of the user himself can be obtained. As a result, in the ball game, since the realistic sensation that the user himself takes part in the game can be created, the interest can be further elevated.

Incidentally, in the foregoing embodiment, although the elliptical mark is shown as an example, the invention is not limited to this shape, but marks of various shapes are applicable without specific limitation. Various shapes, for example, a polygon such as a triangle or a square, or a star shape, are applicable.

Incidentally, in this embodiment, although the description has been made on the case where the trajectory of the ball draws an arc, the invention is not limited to this. For example, when the weather of the baseball stadium is bad and there is a strong wind blowing, such a case is conceivable that the ball repeats rising and falling by the influence of the wind so that it is difficult for the user to predict the trajectory of the ball. In such a case, since the future position of the ball is predicted by calculation for every frame, a more realistic trajectory of the ball than the prior art can be presented. To such real trajectory of the ball, the user can feel the interest of the game that he or she must move the fielder properly to the catching position by predicting the trajectory of the ball through the mark.

Incidentally, in the foregoing embodiment, although the baseball game is cited as an example of the ball game, the present invention is not limited to this, but the invention can be applied to soccer, basketball, American football, tennis, ice hockey, or the like as long as the game is such a ball game that a player in the game catches a ball. It is possible to obtain the same effect even in a ball game other than the baseball game.

The present invention can be applied to any of a game special purpose machine, an arcade machine, a personal computer, a portable information terminal, a portable telephone, and the like.

In the foregoing embodiment, although the program for realizing the embodiment of the present invention is recorded in the CD-ROM or the hard disk, the present invention is not limited to this, but it may be recorded in a computer readable recording medium such as an MO (magnetic optical disk) or DVD. Besides, in the case where the above program is downloaded to the hard disk, a commercial network, Internet, intranet, extranet or the like may be used as the network 111 (see FIG. 1).

As described above, according to the present invention, since the future position of the moving ball is indicated by a mark, and the mark is displayed in a color corresponding to the height of the ball on the ground while it is made to follow the movement of the ball, it is possible to provide a computer readable recording medium recording a program of a ball game and the program, and a ball game processing apparatus and its method, in which the real pleasure of operations by the combination of the operation support of the computer and the operation skill of the user himself can be obtained.

What is claimed is:

1. A computer readable recording medium recording a program of a ball game, which realizes the ball game in which a player handles a movable ball on the ground, the recording medium recording the program for causing a computer to execute:

a calculation of a trajectory of the moving ball;

a judgement of a height of the ball moving on the calculated trajectory at a present movement position;

an indication of a future movement position positioned ahead of the present movement position on a time axis by a mark displayed on the ground, the mark following a movement position of the ball moving on the calculated trajectory; and a change of a color of the mark in accordance with the judged height of the ball at the present movement position.

2. The recording medium according to claim 1, wherein the program causes the computer to execute the change of the color of the mark just before or after the height of the moving ball reaches a peak.

3. The recording medium according to claim 1, wherein the program causes the computer to execute fixing of the color of the mark and a display position thereof when a positional relation between the moving ball and the player satisfies a predetermined condition.

4. The recording medium according to claim 3, wherein the program causes the computer to execute a judgement as to whether or not the predetermined condition is satisfied on the basis of a positional relation between the mark and the player.

5. The recording medium according to claim 1, wherein the program causes the computer to execute a display of the mark beneath the future movement position.

6. The recording medium according to claim 1, wherein the program causes the computer to execute a display of the mark in an elliptical shape.

7. The recording medium according to claim 1, wherein the program causes the computer to execute a display of the mark and to execute an indication of a shadow of the ball at the present movement position.

8. A computer program product of a ball game, which realizes the ball game in which a player handles a movable ball on the ground, the computer program product causing a computer to execute:

a calculation of a trajectory of the moving ball;

a judgement of a height of the ball moving on the calculated trajectory at a present movement position;

an indication of a future movement position positioned ahead of the present movement position on a time axis by a mark displayed on the ground, the mark following a movement position of the ball moving on the calculated trajectory; and a change of a color of the mark in accordance with the judged height of the ball at the present movement position.

9. The computer program product according to claim 8, wherein the computer program product causes the computer to execute the change of the color of the mark one of just before and after the height of the moving ball reaches a peak.

10. The computer program product according to claim 8, wherein the computer program product causes the computer to execute fixing of the color of the mark and a display position thereof when a positional relation between the moving ball and the player satisfies a predetermined condition.

11. The computer program product according to claim 10, wherein the computer program product causes the computer to execute a judgement as to whether or not the predetermined condition is satisfied on the basis of a positional relation between the mark and the player.

12. The computer program product according to claim 8, wherein the computer program product causes the computer to execute a display of the mark beneath the future movement position.

13. The computer program product according to claim 8, wherein the computer program product causes the computer to execute a display of the mark in an elliptical shape.

14. The computer program product according to claim 8, wherein the computer program product causes the computer to execute a display of the mark and to execute an indication of a shadow of the ball at the present movement position.

15. A ball game processing apparatus comprising:

a computer readable recording medium recording a program for realizing a ball game in which a ball is handled on the ground;

a computer for reading out at least a part of the program from the recording medium and executing at least the part of the program; and a display for displaying the ball game realized by the program, wherein the computer reads out at least the part of the program from the recording medium to execute:

a calculation of a trajectory of a moving ball;

a judgement of a height of the ball moving on the calculated trajectory at a present movement position;

an indication of a future movement position positioned ahead of the present movement position on a time axis by a mark displayed on the ground, the mark following a movement position of the ball moving on the calculated trajectory; and a change of a color of the mark in accordance with the judged height of the ball at the present movement position.

16. The ball game processing apparatus according to claim 15, wherein the program causes the computer to execute the change of the color of the mark just before or after the height of the moving ball reaches a peak.

17. The ball game processing apparatus according to claim 15, wherein the program causes the computer to execute fixing of the color of the mark and a display position thereof when a positional relation between the moving ball and the player satisfies a predetermined condition.

18. The ball game processing apparatus according to claim 15, wherein the program causes the computer to execute a judgement as to whether or not the predetermined condition is satisfied on the basis of a positional relation between the mark and the player.

19. The ball game processing apparatus according to claim 15, wherein the program causes the computer to execute a display of the mark beneath the future movement position.

20. The ball game processing apparatus according to claim 15, wherein the program causes the computer to execute a display of the mark in an elliptical shape.

21. The ball game processing apparatus according to claim 15, wherein the program causes the computer to execute a display of the mark and to execute an indication of a shadow of the ball at the present movement position.

22. A ball game processing method for realizing a ball game in which a player handles a movable ball on the ground, the method comprising:

calculating a trajectory of the moving ball;

judging a height of the ball moving on the calculated trajectory at a present moving position;

indicating a future moving position positioned ahead of the present movement position on a time axis by a mark displayed on the ground, the mark following a movement position of the ball moving on the calculated trajectory; and changing a color of the mark in accordance with the judged height of the ball at the present movement position.

23. The ball game processing method according to claim 22, wherein the color of the mark is changed just before or after the height of the moving ball reaches a peak.

24. The ball game processing method according to claim 22, wherein the color of the mark and a display position thereof are fixed when a positional relation between the moving ball and the player satisfies a predetermined condition.

25. The ball game processing method according to claim 24, wherein a judgement as to whether or not the predetermined condition is satisfied is made on the basis of a positional relation between the mark and the player.

26. The ball game processing method according to claim 22, wherein the mark is displayed roughly just under the future movement position.

27. The ball game processing method according to claim 22, wherein the mark is displayed in an elliptical shape.

28. The ball game processing method according to claim 22, wherein the mark is displayed and a shadow of the ball at the present movement position is displayed.

* * * * *

UNITED STATES PATENT AND TRADEMARK OFFICE
CERTIFICATE OF CORRECTION

PATENT NO. : 6,478,678 B1
DATED : November 12, 2002
INVENTOR(S) : S. Rimoto et al.

It is certified that error appears in the above-identified patent and that said Letters Patent is hereby corrected as shown below:

<u>Title page,</u>
Item [73], Assignee, "Inc." should be -- Ltd. --.

Signed and Sealed this

Ninth Day of September, 2003

JAMES E. ROGAN
*Director of the United States Patent and Trademark Office*